(12) United States Patent
Lehner

(10) Patent No.: US 10,416,978 B2
(45) Date of Patent: Sep. 17, 2019

(54) PREDICTING WHETHER A PARTY WILL PURCHASE A PRODUCT

(71) Applicant: Ivanti, Inc., South Jordan, UT (US)

(72) Inventor: Brandon Lehner, Vadnais Heights, MN (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 15/671,645

(22) Filed: Aug. 8, 2017

(65) Prior Publication Data

US 2018/0081662 A1   Mar. 22, 2018

Related U.S. Application Data

(62) Division of application No. 13/771,753, filed on Feb. 20, 2013, now Pat. No. 9,733,917.

(51) Int. Cl.
| | |
|---|---|
| *G06F 8/61* | (2018.01) |
| *G06Q 30/02* | (2012.01) |
| *G06F 3/01* | (2006.01) |
| *G06F 9/445* | (2018.01) |
| *G06F 9/451* | (2018.01) |

(52) U.S. Cl.
CPC ............ *G06F 8/61* (2013.01); *G06F 3/01* (2013.01); *G06F 9/445* (2013.01); *G06F 9/452* (2018.02); *G06Q 30/0202* (2013.01)

(58) Field of Classification Search
None
See application file for complete search history.

(56) References Cited

U.S. PATENT DOCUMENTS

| | | | | |
|---|---|---|---|---|
| 6,131,192 | A * | 10/2000 | Henry | G06F 8/61 |
| | | | | 707/999.101 |
| 6,182,279 | B1 * | 1/2001 | Buxton | G06F 8/36 |
| | | | | 717/100 |
| 6,289,382 | B1 * | 9/2001 | Bowman-Amuah | |
| | | | | G06F 13/387 |
| | | | | 709/226 |
| 6,339,832 | B1 * | 1/2002 | Bowman-Amuah ... | G06F 9/542 |
| | | | | 710/266 |
| 6,842,906 | B1 * | 1/2005 | Bowman-Amuah ... | G06F 9/465 |
| | | | | 718/104 |
| 7,275,235 | B2 * | 9/2007 | Molinari | G01R 13/345 |
| | | | | 717/100 |
| 7,289,964 | B1 * | 10/2007 | Bowman-Amuah | |
| | | | | G06F 9/5038 |
| | | | | 705/1.1 |
| 7,552,113 | B2 * | 6/2009 | Roe | G06F 17/30867 |
| 7,949,563 | B2 * | 5/2011 | Collins | G06Q 10/0631 |
| | | | | 705/14.43 |
| 8,126,881 | B1 * | 2/2012 | Sethi | G06F 17/30536 |
| | | | | 707/723 |

(Continued)

OTHER PUBLICATIONS

Office Action for U.S. Appl. No. 13/771,753, dated Feb. 25, 2016, 22 pages.

(Continued)

*Primary Examiner* — Gurkanwaljit Singh

(57) ABSTRACT

A method for predicting whether a party will purchase a product. The method includes accessing data wherein the data is obtained from a plurality of computing environments of a plurality of parties, analyzing the data; and predicting whether one of the plurality of parties will purchase a product based on the analyzed data.

20 Claims, 4 Drawing Sheets

(56) References Cited

U.S. PATENT DOCUMENTS

| | | | |
|---|---|---|---|
| 8,417,715 B1* | 4/2013 | Bruckhaus | G06F 17/30994 707/758 |
| 8,429,630 B2* | 4/2013 | Nickolov | G06F 9/4856 717/110 |
| 8,544,095 B2* | 9/2013 | Mahaffey | G06F 21/564 726/23 |
| 8,615,581 B2* | 12/2013 | Dare | H04L 41/0253 370/352 |
| 8,650,290 B2* | 2/2014 | Dare | G06F 3/0481 709/224 |
| 8,745,739 B2* | 6/2014 | Mahaffey | G06F 21/564 726/22 |
| 8,752,176 B2* | 6/2014 | Mahaffey | G06F 21/564 726/22 |
| 9,733,917 B2 | 8/2017 | Lehner | |
| 2003/0058277 A1* | 3/2003 | Bowman-Amuah | G06F 17/30607 715/765 |
| 2005/0234761 A1* | 10/2005 | Pinto | G06F 17/50 705/7.28 |
| 2006/0253537 A1* | 11/2006 | Thomas | G06Q 10/107 709/206 |
| 2007/0011224 A1* | 1/2007 | Mena | G06Q 30/02 709/200 |
| 2007/0027754 A1* | 2/2007 | Collins | G06Q 10/0631 705/14.48 |
| 2007/0094066 A1* | 4/2007 | Kumar | G06Q 10/04 706/61 |
| 2007/0138268 A1* | 6/2007 | Tuchman | G06Q 30/02 235/383 |
| 2007/0208610 A1* | 9/2007 | Pisaris-Henderson | G06F 17/30899 705/14.1 |
| 2008/0091448 A1* | 4/2008 | Niheu | G06Q 10/06 705/301 |
| 2008/0120278 A1* | 5/2008 | Roe | G06F 17/30867 |
| 2009/0276771 A1* | 11/2009 | Nickolov | G06F 9/4856 717/177 |
| 2010/0179855 A1* | 7/2010 | Chen | G06Q 10/063 705/7.31 |
| 2011/0047540 A1* | 2/2011 | Williams | G06F 8/61 717/178 |
| 2011/0071900 A1* | 3/2011 | Kamath | G06Q 30/02 705/14.46 |
| 2011/0082711 A1* | 4/2011 | Poeze | A61B 5/14532 705/3 |
| 2011/0184806 A1* | 7/2011 | Chen | G06K 9/6226 705/14.52 |
| 2011/0213753 A1* | 9/2011 | Manmohan | G06F 11/2023 707/640 |
| 2011/0258049 A1* | 10/2011 | Ramer | G06F 17/30867 705/14.66 |
| 2011/0314142 A1* | 12/2011 | Newton | G06Q 30/0201 709/224 |
| 2012/0032945 A1* | 2/2012 | Dare | G06F 3/0481 345/418 |
| 2012/0036220 A1* | 2/2012 | Dare | G06F 8/61 709/217 |
| 2012/0036245 A1* | 2/2012 | Dare | G06F 8/60 709/223 |
| 2012/0036440 A1* | 2/2012 | Dare | G06F 9/54 715/734 |
| 2012/0069131 A1* | 3/2012 | Abelow | G06Q 10/067 348/14.01 |
| 2012/0110174 A1* | 5/2012 | Wootton | G06F 21/564 709/224 |
| 2012/0143861 A1* | 6/2012 | Sethi | G06F 17/30536 707/731 |
| 2012/0185913 A1* | 7/2012 | Martinez | G06F 9/455 726/1 |
| 2012/0215622 A1* | 8/2012 | Ramer | G06F 17/30867 705/14.44 |
| 2012/0215623 A1* | 8/2012 | Ramer | G06F 17/30867 705/14.44 |
| 2012/0278091 A1* | 11/2012 | Yaseen | G06Q 30/0202 705/1.1 |
| 2013/0138507 A1* | 5/2013 | Kumar | G06Q 30/0251 705/14.54 |
| 2013/0151314 A1* | 6/2013 | Kugler | G06Q 30/0201 705/7.32 |
| 2013/0152125 A1* | 6/2013 | Xiong | H04N 21/25891 725/34 |
| 2013/0218805 A1* | 8/2013 | Mao | G06Q 30/0201 705/36 R |
| 2013/0268652 A1* | 10/2013 | Hugard, IV | H04W 4/38 709/224 |
| 2013/0281130 A1* | 10/2013 | Yang | G01S 19/09 455/456.3 |

OTHER PUBLICATIONS

Office Action for U.S. Appl. No. 13/771,753, dated Jan. 16, 2015, 19 pages.

Office Action for U.S. Appl. No. 13/771,753, dated Jun. 29, 2016, 24 pages.

Office Action for U.S. Appl. No. 13/771,753, dated Aug. 13, 2015, 23 pages.

* cited by examiner

400

```
┌─────────────────────────────────────────────────────────┐
│ ACCESS DATA, BY A VENDOR, WHEREIN THE DATA IS OBTAINED  │
│ FROM A PLURALITY OF COMPUTING ENVIRONMENTS OF A         │
│                  PLURALITY OF PARTIES                    │
│                          410                             │
│  ┌───────────────────────────────────────────────────┐  │
│  │ ACCESS DATA, BY THE VENDOR, WHEREIN THE DATA IS   │  │
│  │ SCANNED FROM COMPUTING ENVIRONMENTS OF A          │  │
│  │ PLURALITY OF PARTIES, WHEREIN AT LEAST ONE OF THE │  │
│  │ PLURALITY OF PARTIES IS A USER OF A PRODUCT OF THE│  │
│  │                      VENDOR                        │  │
│  │                        412                         │  │
│  └───────────────────────────────────────────────────┘  │
└─────────────────────────────────────────────────────────┘
                            │
                            ▼
┌─────────────────────────────────────────────────────────┐
│              ANALYZE THE DATA, BY THE VENDOR             │
│                          420                             │
│  ┌───────────────────────────────────────────────────┐  │
│  │   ANALYZE THE DATA BY A MACHINE LEARNING ALGORITHM│  │
│  │                        422                         │  │
│  └───────────────────────────────────────────────────┘  │
└─────────────────────────────────────────────────────────┘
                            │
                            ▼
┌─────────────────────────────────────────────────────────┐
│  PREDICT REVENUE GENERATION OF THE PLURALITY OF PARTIES │
│            BASED ON THE ANALYZING THE DATA              │
│                          430                             │
│  ┌───────────────────────────────────────────────────┐  │
│  │ PREDICT WHETHER ONE OF THE PLURALITY OF PARTIES WILL│
│  │             ACCEPT AN UPSELL OFFER                 │  │
│  │                        432                         │  │
│  └───────────────────────────────────────────────────┘  │
│  ┌───────────────────────────────────────────────────┐  │
│  │ PREDICT WHETHER A POTENTIAL NEW CUSTOMER OF THE   │  │
│  │  VENDOR WILL PURCHASE A PRODUCT OF THE VENDOR     │  │
│  │                        434                         │  │
│  └───────────────────────────────────────────────────┘  │
└─────────────────────────────────────────────────────────┘

┌─────────────────────────────────────────────────────────┐
│            PROVIDE A NOTIFICATION OF THE PREDICTION     │
│                          440                             │
└─────────────────────────────────────────────────────────┘

┌─────────────────────────────────────────────────────────┐
│ PRIORITIZE WHICH OF THE PLURALITY OF PARTIES TO PROVIDE AN│
│                     UPSELL OFFER                         │
│                          450                             │
└─────────────────────────────────────────────────────────┘
```

FIG. 4

PREDICTING WHETHER A PARTY WILL PURCHASE A PRODUCT

CROSS-REFERENCE TO RELATED APPLICATIONS

This application is a divisional of U.S. application Ser. No. 13/771,753, entitled "Predicting Whether a Party Will Purchase a Product," filed Feb. 20, 2013, the disclosure of which is incorporated by reference herein in its entirety for all purposes.

BACKGROUND

Optimization of time and resources of a sales force can be very subjective. For example, determining which products are to be sold to which customer often includes subjective human input. As a result of the subjectivity, time and resources of a sales force are not be efficiently implemented.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 4 depicts a method for predicting revenue generation, according to various embodiments.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
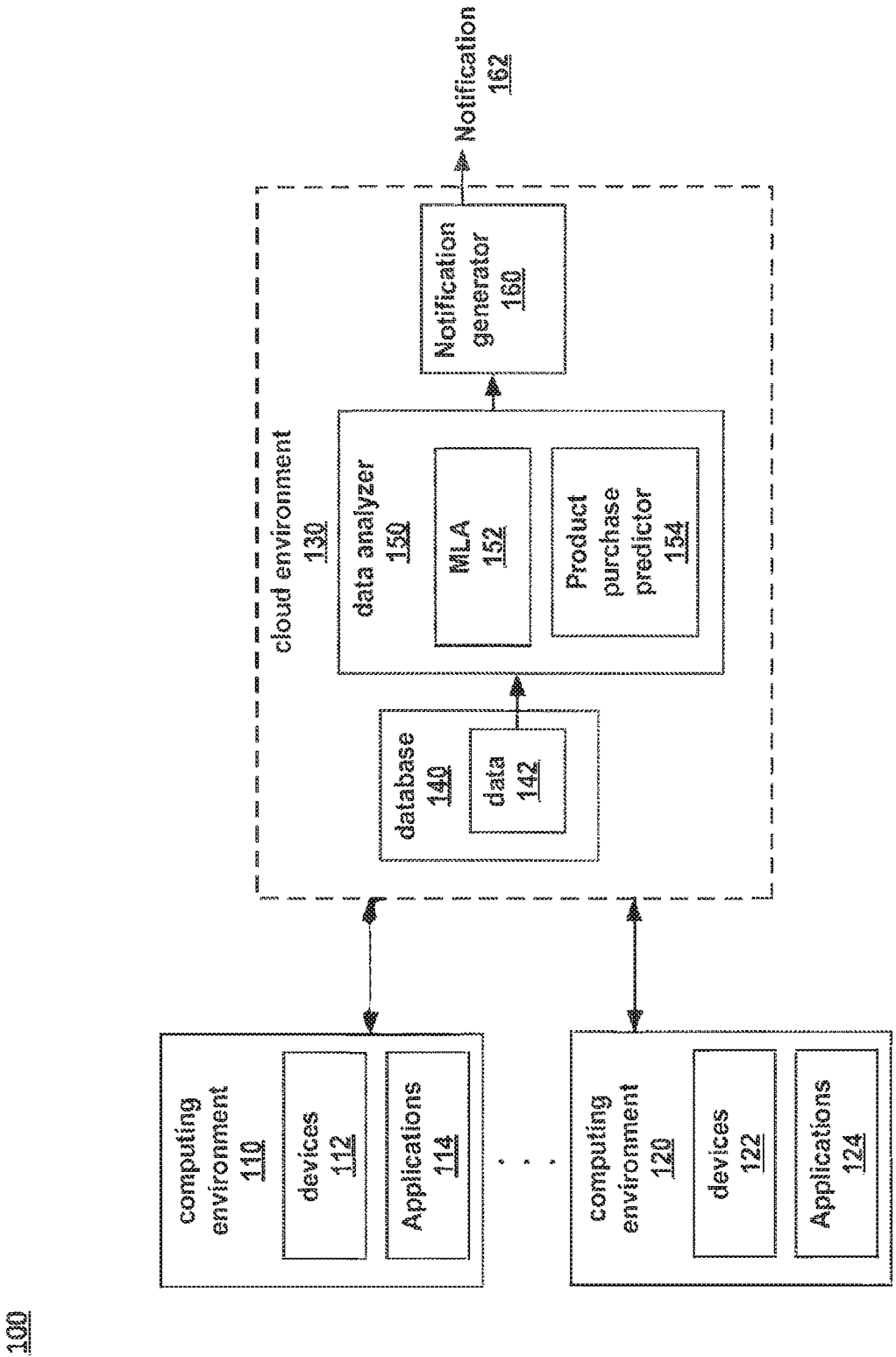
FIG. 1 is a block diagram that illustrates an embodiment of computing system.

FIG. 1 depicts a block diagram that illustrates an embodiment of computing system 100. System 100 includes, among other things, computing environment 110, computing environment 120, and cloud environment 130. In general, computing environment 110 and computing environment 120 are communicatively coupled to cloud environment 130 and may access functionality of cloud environment 130.

Computing environment 110 includes a plurality of devices 112. Devices 112 are any number of physical and/or virtual machines. For example, in some embodiments, computing environment 110 is a corporate computing environment that includes tens of thousands of physical and/or virtual machines (e.g., devices 112).

Devices 112 include a variety of applications, such as applications 114 (e.g., installed software). The devices may have the same installed applications or may have different installed software. The installed software may be one or more software applications from one or more vendors.

Computing environment 120 is similar to computing environment 110, as described above. For example, computing environment 120 includes devices 122 (similar to devices 112), and applications 124 (similar to applications 114). In one embodiment, computing environment 120 is a corporate computing environment that is separate from and does not communicate with computing environment 110.

Although two computing environments are depicted, it should be appreciated that any number of computing environments may be communicatively coupled with cloud environment 130.

Cloud environment 130 (e.g., a VMware Go™ Cloud) is a device comprising at least one processor and memory. As described herein, cloud environment 130 may be located in an Internet connected data center or a private cloud computing center coupled with one or more public and/or private networks. Cloud environment 130 typically couples with a virtual or physical entity in a computing environment (e.g., computing environments 110 and 120) through a network connection which may be a public network connection, private network connection, or some combination thereof.

For example, a user in computing environment 110 may couple via an Internet connection with cloud environment 130 by accessing a web page or application presented by cloud environment 130 at a virtual or physical entity within computing environment 110.

Example Computing Environment Scanning

Cloud environment 130 is operable to scan computing environments (e.g., computing environments 110 and 120). For the purposes of this disclosure, performing a scan refers to operations including, but not limited to: downloading data, such as an executable scan utility, to a computing environment 110; locally executing a process in the computing environment; collecting scan data from the computing environment being scanned within the computing environment; filtering the collected scan data within the computing environment being scanned; uploading scan data from the computing environment, which was scanned, to cloud environment 130 for additional processing, etc.

In one embodiment, a scan involves data being collected by and sent from a device belonging to a computing environment or having access to the computing environment. For example, a scan may be initiated in computing environment through a web browser on a computer belonging to a user in computing environment 110. While viewing a web page presented by cloud environment 130, the user may select a selectable scan function on the web page. In response, data such as an executable scan utility is downloaded to computing environment 110 through the user's browser, and when allowed by the user to execute, a scan of computing environment 110 is conducted.

In one embodiment, a scan utilizes an agentless scanner and collects scan data. In an embodiment, an agentless scanner is a local executable stored in temporary storage of a computing environment (e.g., a agentless scanner is a dissolving agent that does not persist in storage after scanning has completed). It should be appreciated that although an installed version of the agentless scanner does not persist in storage, the executable may be cached and reused on subsequent executions. An agentless scanner is deployed, remotely scans computing environment 110 from a location within the computing environment 110, and then forwards the collected scan data (which may be processed to some extent before forwarding) to a central location (e.g., database 140).

In another embodiment, a scan utilizes an agent, such as a scanning utility that may be installed as a program at one or more locations within a computing environment, and which remains installed (persists in storage) after performing the scan. An installed agent scanner may be downloaded and installed from cloud environment 130 and similarly scans and forwards the scan data, as described above with regard to the agentless scanner.

In an embodiment, a scan determines the installed software (e.g., applications 114 and 124) within the computing environments. This can also involve the scan gathering configuration information of installed software on machines and virtual machines in a computing environment (e.g., computing environments 110 and 120). Scanning to gather configuration information may be referred to as software management scanning (e.g., gathering information about the operating system configuration, gathering information about management software including information about hardware configuration, etc.). Moreover, a scan determines which applications have been purchased from what vendors.

In an embodiment, a scan may involve a patch management scanner that scans a computing environment to discover patches installed to installed software of machines and virtual machines in the computing environment. In one embodiment, a patch management scanner is operable to identify both installed and missing security patches.

In some embodiments, a plurality of scans are performed. A plurality of scans may be performed in any manner, including one or more of the scans being performed synchronously, asynchronously, and/or one or more of the scans being performed in a particular order. For example, a network discover scan may be performed, followed by an installed software discover scan, followed by a software configuration scan being performed synchronously with an installed patch scan. In one embodiment, feedback may be provided synchronously such that a user can observe the progress of a scan. Scans may also be run asynchronously as a safeguard when a scan fails due to cancellation or failure.

Sending Data to a Cloud Environment

In an embodiment, the output of an individual scan is scan data that is sent (e.g., forwarded, streamed, etc.) to cloud environment 130. In one embodiment, for example, all scan data, gathered by a scan of computing environments is packaged before it is sent to cloud environment 130 in a single file transmission. In another embodiment, such scan data is streamed to cloud environment 130. In such a case, a portion of scan data is gathered from a scan may be sent to cloud environment 130 as it is gathered from the scanning process within the respective computing environment (e.g., computing environments 110 and 120).

The output of the scans of the computing environments is data 142 which is stored in database 140.

Analyzing Data

Data analyzer 150 is for analyzing data 142. Data analyzer 150 is implemented by a cloud environment 130 (e.g., a computing system). For example, data analyzer 150 is implemented by a processor(s) of cloud environment 130.

Data 142 is the data scanned from the computing environments, as described above. Data analyzer 150 may access data other than the data scanned from the computing environments.

Data analyzer 150 receives and analyzes data 142 and generates predictions as to which company or companies are likely to purchase products. For example, computing environments (e.g., computing environments 110 and 120) are computing environments of discrete companies. Accordingly, data analyzer 150 is able to predict, based on the data scanned from the discrete companies, which company or companies are likely to purchase products (e.g., applications, software packages, etc.).

As stated above, the computing environments may access functionality of cloud environment 130. In particular, the computing environments may have software (e.g., Vcenter™) provided by the owner/controller (e.g., VMware™) of cloud environment 130. As such, the owner/controller of cloud environment 130 is a vendor to one or more of the companies that control the computing environments.

In various embodiments, data analyzer 150 may predict which company will most likely accept an upsell offer, predict which company will be most profitable to a vendor, determine which companies that the vendor should target for future sales, etc.

In one embodiment, product purchase predictor 154, among other things, predicts which company will most likely accept an upsell offer, predicts which company will be most profitable to a vendor, etc. Product purchase predictor 154 is implemented by cloud environment 130 (e.g., a computing system). For example, product purchase predictor 154 is implemented by a processor(s) of cloud environment 130.

In one embodiment, data analyzer 150 utilizes machine learning algorithm 152 for analyzing data 142. In general, a machine learning algorithm provides computers the ability to learn without being explicitly programmed. More specifically, data analyzer 150 is able to analyze data 142 based solely on empirical parameters from data 142. In other words, data analyzer 150 is able to analyze data 142 based on statistics/analytics without requiring subjective input or parameters from users.

Machine learning algorithm 152 can be any machine learning algorithm that is conducive to analyzing data 142, such as, but not limited to, neural networks, genetic programming, Bayesian networks, etc.

Figure 2:
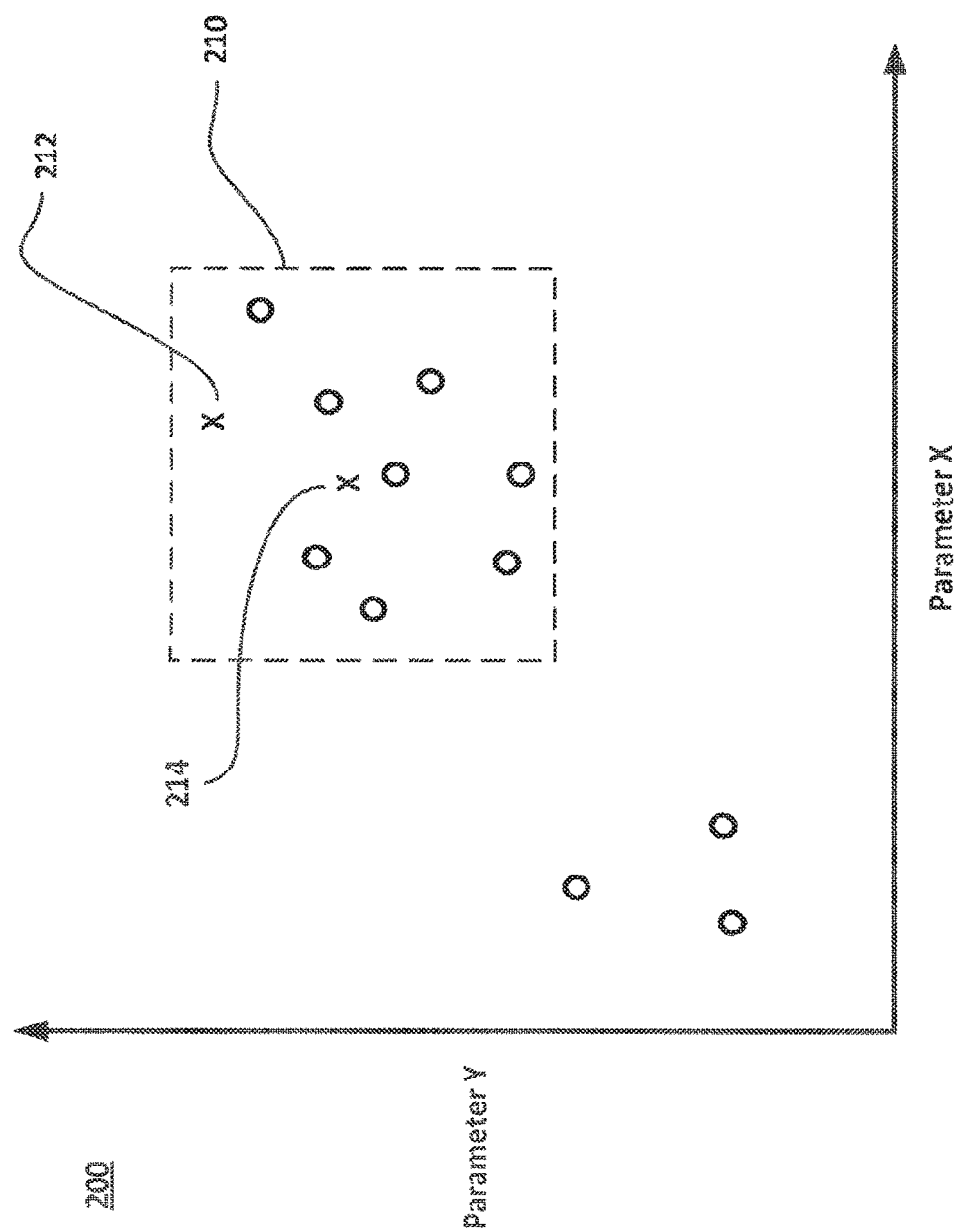
FIG. 2 is an embodiment of a scatter plot of related companies with respect to various parameters.

FIG. 2 depicts an embodiment of scatter plot 200 of an analysis accomplished by data analyzer 150. For example, machine learning algorithm 152 analyzes data 142, which includes data from at least thirteen different companies. Eleven companies are depicted as an "O" and two companies are depicted as an "X," which will be described in further detail below. It is noted that data 142 can include data scanned from any number of different companies.

Machine learning algorithm 152 determines that there are two important parameters (e.g., parameter X and parameter Y) that will facilitate in predicting which company or companies are likely to purchase products. It is noted that any number of parameters may be determined by the machine learning algorithm.

Parameters X and Y are any parameters or combination of parameters that may be gathered from data 142. For example, parameters X and Y can be any one of, but are not limited to, number of hypervisors on a network, number of Vcenters™, number of virtual machines, number of users in company, etc.

Referring to FIG. 2, in one embodiment, Parameter X is the number of Vcenters™, and Parameter Y is the number of hypervisors on the network. The data plotted on the scatter plot 200 depicts a group of companies that are clustered together in cluster 210. The cluster of companies have similar with respect to parameter X (e.g., number of Vcenters™) and parameter Y (e.g., number of hypervisors in the network).

Moreover, the companies, depicted by an "O" are companies that are up-to-date on current licenses for various products of the vendor. In contrast, the companies 212 and 214, depicted by an "X" within cluster 210 are companies that are not up-to-date on current licenses for various products of the vendor. As such, companies 212 and 214 are prime candidates for updating their current licenses.

Therefore, based on the machine learning algorithm, the vendor is able to predict that companies 212 and 214 that are not up-to-date on their current licenses are likely to update their current licenses because the eight companies in cluster 210 (which are similar to the two companies that are not up-to-date) have already updated their current licenses.

In another example, Parameter X is virtualized workload and Parameter Y is the number of users in the company. As such, companies are grouped together in cluster 210 that are most related to each other with respect to Parameter X and Parameter Y. The companies, depicted as an "O" in cluster 210 have purchased a particular application from the vendor, while companies 212 and 214 have not purchased the particular application. Accordingly, it can be predicted that companies 212 and 214 are prime candidates for purchasing the particular application.

In various embodiments, the machine learning algorithm may predict which company will most likely accept an upsell offer, predict which company will be most profitable to a vendor, determine which companies that the vendor should target for future sales, etc. Moreover, the vendor is able to prioritize on who to sell to (e.g., current and/or future users) and which companies may bring in the most revenue.

Generating a Notification

Notification generator 160 is for generating notification 162. Notification generator 160 is implemented by cloud environment 130 (e.g., a computing system). For example, product purchase predictor 154 is implemented by a processor(s) of cloud environment 130.

Notification 162 can be any notification that is for notifying the vendor and/or companies of the results of the data analyzer 150. For example, notification 162 is the output of the machine learning algorithm and is provided to the two companies depicted by "X" shown in FIG. 2, that are likely to purchase products from the vendor.

Notification 162 can be automatically provided to the vendor and/or companies. For example, an automated upsell inquiry is provided to the companies.

Notification 162 can be presented to a customer via a web portal. Notification 162 can be pushed to a customer via email, by a product, or a reporting tool that reports to a management team or engineers, etc.

Example Methods of Operation

The following discussion sets forth in detail the operation of some example methods of operation of embodiments.

Figure 3:
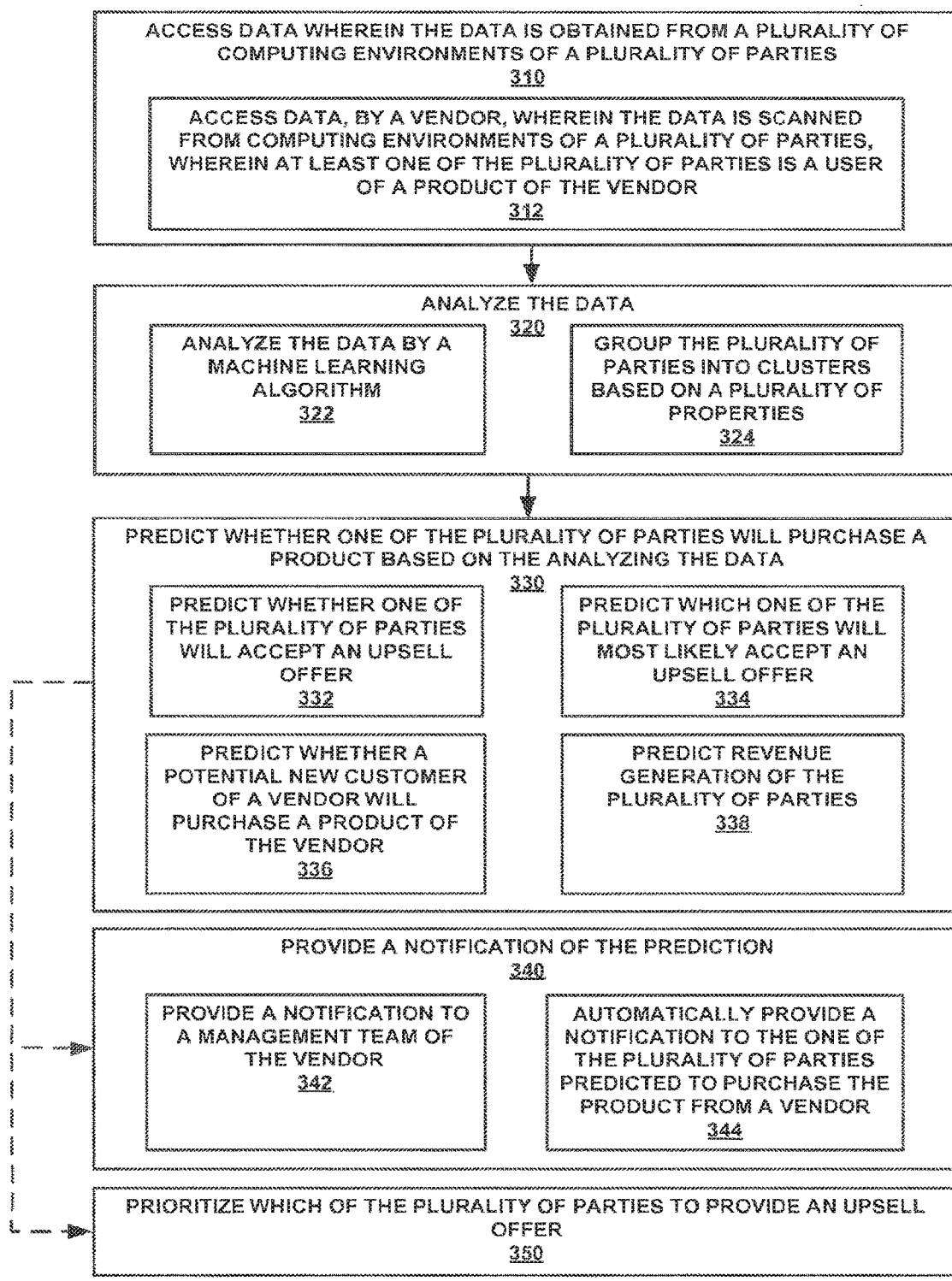
FIG. 3 depicts a method for predicting whether a party will purchase a product, according to various embodiments.

With reference to FIGS. 3 and 4, flow diagrams 300 and 400 illustrate example procedures used by various embodiments. Flow diagrams 300 and 400 include some procedures that, in various embodiments, are carried out by a processor under the control of computer-readable and computer-executable instructions. In this fashion, procedures described herein and in conjunction with flow diagrams 300 and/or 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments and/or cloud environment 130. The computer-readable and computer-executable instructions, which reside on tangible computer readable storage media, are used to control or operate in conjunction with, for example, one or some combination of processors of the computer environments and/or cloud environment 130. It is appreciated that the processor(s) may be physical or virtual or some combination (it should also be appreciated that a virtual processor is implemented on physical hardware). Although specific procedures are disclosed in flow diagrams 300 and/or 400, such procedures are examples. That is, embodiments are well suited to performing various other procedures or variations of the procedures recited in flow diagrams 300 and/or 400. Likewise, in some embodiments, the procedures in flow diagrams 300 and/or 400 may be performed in an order different than presented and/or not all of the procedures described in one or more of these flow diagrams may be performed. It is further appreciated that procedures described in flow diagrams 300 and/or 400 may be implemented in hardware, or a combination of hardware with firmware and/or software.

FIG. 3 depicts a flow diagram for a method for predicting whether a party will purchase a product, according to various embodiments.

Referring now to FIG. 3, at 310, data is accessed, wherein the data is obtained from a plurality of computing environments of a plurality of parties. For example, data 142 is comprised of data from respective various computing environments (e.g., computing environments 110 and 120). The computing environments are discrete computing environments from respective parties.

At 312, in one embodiment, data is accessed, by a vendor, wherein the data is scanned from computing environments of a plurality of parties, wherein at least one of the plurality of parties is a user of a product of the vendor.

For example, data 142 is accessed by the vendor (the vendor is the owner of cloud environment 130). At least one of the companies or parties is a user or customer of product(s) of the vendor (e.g., VMware™).

At 320, the data is analyzed. For example, data analyzer 150 analyzes data 142. For example, data analyzer 150 accesses and analyzes data 142 to facilitate in predicting whether a party will purchase a product.

At 322, in one embodiment, the data is analyzed by a machine learning algorithm. For example, data 142 is accessed and analyzed by machine learning algorithm 152 and determines which customers are related the most, based on various parameters.

At 324, in another embodiment, the plurality of parties are grouped into clusters based on a plurality of properties. For example, machine learning algorithm 152 determines that ten companies are related together based on parameters X and Y. As such, the ten companies are grouped together into cluster 210.

At 330, whether one of the plurality of parties will purchase a product is predicted based on the analyzing the data. For example, companies are grouped together in cluster 210 with respect to relationships between various parameters. Some of the companies have purchased certain products, but others have not. Accordingly, it can be predicted that the companies that have not purchased the certain products are likely to do so because the other companies in the cluster have purchased the products.

At 332, whether one of the plurality of parties will accept an upsell offer is predicted. For example, the machine learning algorithm predicts whether one or more companies will accept an upsell offer. That is, a user of the vendor's products is predicted to accept an upsell offer to upgrade already purchased products.

At 334, which one of the plurality of parties will most likely accept an upsell offer is predicted. For example, company 214 is more "centrally" located within cluster 210, as compared to company 212. As such, company 214 is more similar to the other companies within cluster 210, depicted by an "O," which have already accepted an upsell offer. Therefore, company 214 is more likely to accept an upsell offer than company 212.

At 336, whether a potential new customer of a vendor will purchase a product of the vendor is predicted. For example, the computing environments of companies 212 and 214 are scanned. Additionally, companies 212 and 214 are presently not customers or users of products from the vendor.

According to the scatter plot of companies, for example, as depicted in FIG. 2, companies 212 and 214 are similar to the other eight companies in cluster 210, who are customers or users of products from the vendor. Therefore, the machine learning algorithm is able to predict that companies 212 and 214, which are potential new customers, will purchase a product of the vendor.

At 338, revenue generation of the plurality of parties is predicted. For example, companies 212 and 214 are grouped in cluster 210 with eight other similar companies, with respect to various parameters. The eight other companies have an average revenue generation for the vendor of amount five million dollars per year. Therefore, the revenue generation of both companies 212 and 214 for the vendor is also around five million dollars per year.

At 340, a notification of the prediction is provided. For example, notification generator 160 provides a notification of a prediction by data analyzer 150 to a company (e.g., current or future user of vendor's products) and/or the vendor (e.g., a sales team).

At 342, a notification is provided to a management team of the vendor. For example, a sales team of the vendor is provided a notification of the prediction by data analyzer 150. As such, the vendor is able focus its time and energy by focusing on the company or companies that are predicted to purchase products from the vendor.

At 344, a notification is automatically provided to the one of the plurality of parties predicted to purchase the product from a vendor. For example, if company 214 is predicted to purchase a product from the vendor, then company 214 is automatically provided a notification of an offer to purchase the product from the vendor.

At 350, a priority is given to a party that an upsell offer is to be provided to. For example, if companies 212 and 214 are deemed to have an upsell offer provided to them, then the vendor gives priority to companies 212 and 214 over other companies.

It is noted that any of the procedures, stated above, regarding method 300 may be implemented in hardware, or a combination of hardware with firmware and/or software. For example, any of the procedures are implemented by a processor(s) of cloud environment 130.

FIG. 4 depicts an embodiment of a flow diagram of a method for predicting revenue generation, according to various embodiments.

Referring now to FIG. 4, at 410, data is accessed, by a vendor, wherein the data is obtained from a plurality of computing environments of a plurality of parties. For example, data 142 is accessed by the vendor (the vendor is the owner of cloud environment 130). The data is obtained from various computing environments (e.g., computing environments 110 and 120) which are owned and operated by discrete companies.

At 412, in one embodiment, data is accessed, by a vendor, wherein the data is scanned from computing environments of a plurality of parties, wherein at least one of the plurality of parties is a user of a product of the vendor.

For example, data 142 is accessed by the vendor (the vendor is the owner of cloud environment 130). At least one of the companies or parties is a user or customer of product(s) of the vendor (e.g., VMware®).

At 420, the data is analyzed. For example, data analyzer 150 analyzes data 142. For example, data analyzer 150 accesses and analyzes data 142 to facilitate in predicting the amount of revenue will be generated by a company.

At 422, in one embodiment, the data is analyzed by a machine learning algorithm. For example, data 142 is accessed and analyzed by machine learning algorithm 152 and determines which customers are related the most, based on various parameters.

At 430, revenue generation of the plurality of parties is predicted based on the analyzing of the data. For example, companies 212 and 214 are grouped in duster 210 with eight other similar companies, with respect to various parameters. The eight other companies have an average revenue generation for the vendor of amount five million dollars per year. Therefore, the revenue generation of both companies 212 and 214 for the vendor is also around five million dollars per year.

At 432, in one embodiment, whether one of the plurality of parties will accept an upsell offer is predicted. For example, it is predicted that company 212 and/or company 214 will accept an upsell offer because both company 212 and company 214 are clustered with other companies who have accepted an upsell offer.

At 434, whether a potential new customer of a vendor will purchase a product of the vendor is predicted. For example, the computing environments of companies 212 and 214 are scanned. Additionally, companies 212 and 214 are presently not customers or users of products from the vendor. As depicted in FIG. 2, companies 212 and 214 are similar to the other eight companies in cluster 210, who are customers or users of products from the vendor. Therefore, the machine learning algorithm is able to predict that companies 212 and 214, which are potential new customers, will purchase a product of the vendor.

At 440, a notification of the prediction is provided. For example, notification generator 160 provides a notification of a prediction by data analyzer 150 to a company (e.g., current or future user of vendor's products) and/or the vendor (e.g., a sales team).

At 450, a priority is given to a party that an upsell offer is to be provided to. For example, if companies 212 and 214 are deemed to have an upsell offer provided to them, then the vendor gives priority to companies 212 and 214 over other companies.

It is noted that any of the procedures, stated above, regarding method 300 may be implemented in hardware, or a combination of hardware with firmware and/or software. For example, any of the procedures are implemented by a processor(s) of cloud environment 130.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

The invention claimed is:

1. A system, comprising:
   a memory; and
   a processor associated with a cloud environment and operatively coupled to the memory, the processor configured to:
   send an scan utility to a set of compute devices having access to a plurality of computing environments associated with a plurality of parties, such that each compute device from the set of compute devices stores an executable associated with the scan utility in a temporary storage of that compute device and executes the executable to collect data associated with a set of computing environments from the plurality of computing environments, each computing environment from the plurality of computing environments including a set of machines, a set of applications, and a set of networks;
   receive the data from the set of compute devices;
   analyze the data using a machine learning model to determine, for each party from the plurality of parties, a value for a parameter;
   associate each party from the plurality of parties, based on the value for the parameter for that party, with at least one other party from the plurality of parties to produce a plurality of clusters, each cluster from the plurality of clusters including a set of parties from the plurality of parties having the value for the parameter for that party that differs less than a predefined degree from the value for the parameter for any other party in that cluster; and
   determine, based on revenue generation information associated with a subset of parties from a set of parties included in a cluster from the plurality of clusters, a prediction of an amount of revenue generation of a party in the set of parties and not in the subset of parties.

2. The system of claim 1, wherein the cloud environment is associated with a vendor that provides a product, and the plurality of parties includes a customer of the product.

3. The system of claim 1, wherein the machine learning model is a neural network model.

4. The system of claim 1, wherein the parameter indicates at least one of: a number of machines from a set of machines in a computing environment from the plurality of computing environments and associated with a party from the plurality of parties, a number of hypervisors on a set of networks in a computing environment from the plurality of computing environments and associated with a party from the plurality of parties, or a number of users associated with a set of machines in a computing environment from the plurality of computing environments and associated with a party from the plurality of parties.

5. The system of claim 1, wherein the subset of parties is a first subset of parties, and the processor is further configured to determine, based on information indicating upsell behavior of a second subset of parties from the set of parties included in the cluster, a likelihood that a party in the set of parties and not in the second subset of parties will accept an upsell offer.

6. The system of claim 1, wherein the subset of parties is a first subset of parties, and the processor is further configured to:
   determine, for each party in the set of parties included in the cluster and not in a second subset of parties from the set of parties, a likelihood that that party will accept an upsell offer based on information indicating upsell behavior of the second subset of parties;
   identify a party in the set of parties and not in the second subset of parties having the likelihood that that party will accept the upsell offer greater than the likelihood that other parties in the set of parties and not in the second subset of parties will accept the upsell offer; and
   send a message to the party in the set of parties and not in the second subset of parties having the likelihood greater than the likelihood of the other parties in the set of parties and not in the second subset of parties, the message including information associated with the upsell offer.

7. The system of claim 1, wherein the subset of parties is a first subset of parties, and the processor is further configured to determine, based on information indicating product purchase behavior of a second subset of parties from the set of parties included in the cluster, a likelihood that a party in the set of parties and not in the second subset of parties will purchase a product.

8. The system of claim 1, wherein the subset of parties is a first subset of parties, and the processor is further configured to:
   determine, for each party in the set of parties included in the cluster and not in a second subset of parties from the set of parties, a likelihood that that party will purchase a product based on information indicating product purchase behavior of the second subset of parties;
   identify a party in the set of parties and not in the second subset of parties having the likelihood that that party will purchase the product greater than the likelihood that other parties in the set of parties and not in the second subset of parties will purchase the product; and
   send a message to the party in the set of parties and not in the second subset of parties having the likelihood greater than the likelihood of the other parties in the set of parties and not in the second subset of parties, the message including information associated with the product.

9. A non-transitory processor-readable medium storing code representing instructions to be executed by a processor, the code comprising code to cause the processor to:
   send a scan utility to a set of compute devices having access to a plurality of computing environments associated with a plurality of parties such that each compute device from the set of compute devices, in response to receiving the scan utility, installs the scan utility to collect data associated with a set of computing environments from the plurality of computing environments, each computing environment from the plurality of computing environments including a set of machines, a set of applications, and a set of networks;

receive the data from the set of compute devices;

analyze the data using a machine learning model to determine, for each party from the plurality of parties, a value for a parameter;

associate each party from the plurality of parties, based on the value for the parameter for that party, with at least one other party from the plurality of parties to produce a plurality of clusters, each cluster from the plurality of clusters including a set of parties from the plurality of parties having the value for the parameter for that party that differs less than a predefined degree from the value for the parameter for any other party in that cluster;

calculate, for a cluster from the plurality of clusters, an average amount of revenue generation of a subset of parties from the set of parties included in the cluster; and determine, based on the average amount of revenue generation calculated for the cluster, a prediction of an amount of revenue generation of a party in the set of parties and not in the subset of parties.

10. The non-transitory processor-readable medium of claim 9, wherein the processor is associated with a cloud environment, the cloud environment is associated with a vendor that provides a product, and the plurality of parties includes a customer of the product.

11. The non-transitory processor-readable medium of claim 9, wherein the machine learning model is a neural network model.

12. The non-transitory processor-readable medium of claim 9, wherein the parameter indicates at least one of: a number of machines from a set of machines in a computing environment from the plurality of computing environments and associated with a party from the plurality of parties, a number of hypervisors on a set of networks in a computing environment from the plurality of computing environments and associated with a party from the plurality of parties, or a number of users associated with a set of machines in a computing environment from the plurality of computing environments and associated with a party from the plurality of parties.

13. The non-transitory processor-readable medium of claim 9, wherein the subset of parties is a first subset of parties, and the code further comprises code to cause the processor to determine, based on information indicating upsell behavior of a second subset of parties from the set of parties included in the cluster, a likelihood that a party in the set of parties and not in the second subset of parties will accept an upsell offer.

14. The non-transitory processor-readable medium of claim 9, wherein the subset of parties is a first subset of parties, and the code further comprises code to cause the processor to determine, based on information indicating product purchase behavior of a second subset of parties from the set of parties included in the cluster, a likelihood that a party in the set of parties and not in the second subset of parties will purchase a product.

15. A method, comprising:

sending, from a processor associated with a cloud environment, a scan utility to a set of compute devices having access to a plurality of computing environments associated with a plurality of parties, each computing environment from the plurality of computing environments including a set of machines, a set of applications, and a set of networks, each compute device from the set of compute devices configured to execute an executable associated with the scan utility to collect data associated with a set of computing environments from the plurality of computing environments;

receiving, at the processor, the data from the set of compute devices;

analyzing, by the processor, the data using a machine learning model to determine, for each party from the plurality of parties, a value for a parameter;

associating, by the processor, a party, based on the value for the parameter for the party, with at least one other party from the plurality of parties to produce a cluster, the cluster including a set of parties from the plurality of parties having the value for the parameter for that party that differs less than a predefined degree from the value for the parameter for any other party in the cluster; and determining, by the processor, based on revenue generation information associated with a subset of parties not including the party and from the set of parties included in the cluster, a prediction of an amount of revenue generation of the party.

16. The method of claim 15, wherein the cloud environment is associated with a vendor that provides a product, the plurality of parties includes a customer of the product, and the party is not a customer of the product.

17. The method of claim 15, wherein the subset of parties is a first subset of parties, the method further comprising:

determining, based on information indicating upsell behavior of a second subset of parties not including the party and from the set of parties included in the cluster, a likelihood that the party will accept an upsell offer.

18. The method of claim 15, wherein the subset of parties is a first subset of parties, the method further comprising:

determining, based on information indicating product purchase behavior of a second subset of parties not including the party and from the set of parties included in the cluster, a likelihood that the party will purchase a product.

19. The method of claim 15, wherein the subset of parties is a first subset of parties, the method further comprising:

determining, based on information indicating product purchase behavior of a second subset of parties not including the party and from the set of parties included in the cluster, a likelihood that the party will purchase a product; and sending, when the likelihood meets a criterion, a message including information associated with the product to the party.

20. The method of claim 15, further comprising sending a message to a vendor associated with the cloud environment, the message including the prediction of the amount of revenue generation.

* * * * *